United States Patent [19]

Plank et al.

[11] 4,341,748
[45] * Jul. 27, 1982

[54] METHOD FOR PRODUCING ZEOLITES

[75] Inventors: Charles J. Plank, Woodbury; Edward J. Rosinski, Pedricktown, both of N.J.; Mae K. Rubin, Bala Cynwyd, Pa.

[73] Assignee: Mobil Oil Corporation, New York, N.Y.

[ * ] Notice: The portion of the term of this patent subsequent to Nov. 20, 1996, has been disclaimed.

[21] Appl. No.: 169,005

[22] Filed: Jul. 15, 1980

Related U.S. Application Data

[60] Division of Ser. No. 23,117, Mar. 23, 1979, which is a continuation-in-part of Ser. No. 841,622, Oct. 13, 1977, Pat. No. 4,175,114, which is a continuation-in-part of Ser. No. 650,481, Jan. 19, 1976, abandoned, which is a continuation-in-part of Ser. No. 424,481, Dec. 13, 1973, abandoned.

[51] Int. Cl.$^3$ ............................................. C01B 33/28
[52] U.S. Cl. ................................. 423/328; 252/455 Z
[58] Field of Search ............................... 423/328–330; 260/448 C; 252/455 Z

[56] References Cited

U.S. PATENT DOCUMENTS 3,702,886 11/1972 Argauer et al. ...................... 423/328
4,175,114 11/1979 Plank et al. ........................ 423/329

FOREIGN PATENT DOCUMENTS 2704039 8/1977 Fed. Rep. of Germany ...... 423/329
1553209 9/1979 United Kingdom ................ 423/329

*Primary Examiner*—Edward J. Meros
*Attorney, Agent, or Firm*—Charles A. Huggett; Michael G. Gilman; Charles J. Speciale

[57] ABSTRACT

As synthesized by previous methods, ZSM-5 or ZSM-11 zeolites are crystallized in the presence of substantial amounts of a nitrogen-containing compound. When synthesized in this way, they contain an organic ammonium cation as well as a metal cation such as sodium. To obtain a more active form, the sodium ion must be exchanged out. Such exchange, especially with ZSM-5 and ZSM-11, is difficult unless there is calcination of the zeolite to remove the obstructing organo compounds. By making these zeolites in the presence of (1) seeds of the desired zeolite, (2) mixtures of them with ammonium hydroxide and/or alcohol, (3) the alcohol per se or (4) mixtures of the alcohol with ammonium hydroxide, a product substantially deficient in organic ammonium cation is obtained. These products can be exchanged directly without any calcination.

1 Claim, No Drawings

METHOD FOR PRODUCING ZEOLITES

CROSS REFERENCE TO RELATED APPLICATIONS

This application is a division of application Ser. No. 023,117, filed Mar. 23, 1979 as a continuation-in-part of U.S. application Ser. No. 841,622, filed Oct. 13, 1977, U.S. Pat. No. 4,175,114; the same being a continuation-in-part of U.S. application Ser. No. 650,481, filed Jan. 19, 1976, abandoned, as a continuation-in-part of U.S. application Ser. No. 424,481, filed Dec. 13, 1973, abandoned.

BACKGROUND OF THE INVENTION

1. Field of the Invention

The invention relates to a process for making zeolites. More particularly it relates to making ZSM-5 or ZSM-11 zeolites which, in their synthesized form, are low in nitrogen content.

2. Summary of the Prior Art

Zeolites of the ZSM-5 type (e.g. ZSM-5 and ZSM-11) and others like zeolite Beta, TEA mordenite and ZSM-12 have been crystallized from a solution containing organic cations, particularly including alkyl ammonium cations. Zeolites ZSM-5 and ZSM-11, in general, have a pore size greater than the 5 Angstrom materials and less than the large pore zeolites such as Zeolite X, Zeolite Beta and the like.

U.S. Pat. No. 3,702,886 is concerned with the zeolite ZSM-5 and some of its uses. U.S. Pat. No. 3,709,979 discloses and claims ZSM-11. So the description of these two zeolites may be complete, the two U.S. patents are hereby incorporated herein by reference. Neither of these patents suggests or teaches the use of ZSM-5 or ZSM-11 seeds to prepare the respective zeolites.

In addition, U.S. Pat. No. 3,119,659 discloses the use of the same type of molecular sieve being produced, as do U.S. Pat. No. 3,321,272 and U.S. Pat. No. 3,532,459. U.S. Pat. No. 3,671,191 teaches a general seeding technique, as does an article by Zhdanov, "Molecular Sieve Zeolites-I" ACS, 1971, pages 36 and 37. German Pat. No. 2,212,810 discloses the use of a mixture of ethyl alcohol, ammonium hydroxide and triethylamine to make ZSM-8 and of a mixture of ammonia, propyl alcohol and tripropylamine to make ZSM-5.

SUMMARY OF THE INVENTION

In accordance with the invention, there is provided a method for synthesizing a ZSM-5 or ZSM-11 crystalline aluminosilicate substantially deficient in nitrogen, preferably no more than about 0.2% by weight, which comprises carrying out the reaction to form said zeolite in the presence of a member selected from the group consisting of ZSM-5 seeds, ZSM-11 seeds and mixtures thereof with NH4OH and/or alcohol. It is to be understood that when seeds are used, ZSM-5 seeds produce ZSM-5 and ZSM-11 seeds produce ZSM-11. This is true whether they are used alone or in a mixture as set forth. It will also be understood that the members included are: (1) ZSM-5 or ZSM-11 seeds; (2) ZSM-5 or ZSM-11 seeds plus alcohol; (3) ZSM-5 or ZSM-11 seeds plus NH4OH; (4) ZSM-5 or ZSM seeds plus alcohol plus NH4OH; (5) alcohol; and (6) alcohol plus NH4O.

The aliphatic alcohol preferably is an alcohol containing 2 to 5 carbon atoms. Illustrative are ethanol, propanol, butanol and pentanol. It is contemplated that the alcohols may be straight or branch chain.

ZSM-5 and ZSM-11 seeds may be from previously prepared batches of ZSM-5 and ZSM-11 made by present methods. Alternatively, seeds of ZSM-5 or ZSM-11 prepared by the process of this invention may be used. Furthermore, it has been discovered that when subsequent batches of ZSM-5 or ZSM-11 zeolites are made in the same equipment, the residual zeolite is sufficient to supply the requisite amount of seeds.

Only a small amount of seeds are needed for the practice of this invention. Generally, from about 0.01% by weight to about 10% by weight of final product is sufficient. We prefer, however, to use from about 1% by weight to 6% by weight.

DESCRIPTION OF SPECIFIC EMBODIMENTS

ZSM-5 has the characteristic X-ray diffraction pattern set forth in Table 1 of U.S. Pat. No. 3,702,866, whether produced by prior art methods or by the method of this invention. ZSM-5 compositions (as well as ZSM-11 compositions) can also be identified in terms of mole ratios of oxides as follows:

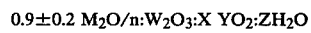

wherein M is a cation, n is the valence of said cation, W is selected from the group consisting of aluminum and gallium, Y is selected from the group consisting of silicon and germanium, X is from about 5 to about 3000 and Z is from 0 to 40. In a preferred form as synthesized by prior art methods the zeolite has a formula, in terms of mole ratios of oxides as follows:

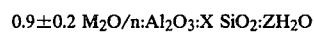

wherein M is selected from the group consisting of a mixture of alkali metal cations, especially sodium, and tetraalklammonium cations, the alkyl groups of which preferably contain 2–5 carbon atoms. In this preferred embodiment of ZSM-5, W is aluminum and Y is silicon. Also the preferred silica/alumina ratio is from about 15 to about 900. More preferably, the silica/alumina ratio is from about 30 to about 350.

Zeolite ZSM-5 is prepared by prior art methods by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE A

|  | Broad | Preferred | Particularly Preferred |
|---|---|---|---|
| $\dfrac{OH^-}{SiO_2}$ | 0.07–1.0 | 0.1–0.8 | 0.2–0.75 |
| $\dfrac{R_4N^+}{(R_4N^+ + Na^+)}$ | 0.2–0.95 | 0.3–0.9 | 0.4–0.9 |
| $\dfrac{H_2O}{OH^-}$ | 10–300 | 10–300 | 10–300 |
| $\dfrac{YO_2}{W_2O_3}$ | 5–100 | 10–60 | 10–40 |

The solution is maintained at reaction conditions until the crystals of the zeolite are formed. Thereafter the crystals are separated from the liquid and recovered. Typical reaction conditions consist of a temperature of from about 75° C. to 175° C. for a period of about six hours to 60 days. A more preferred temperature range is from about 90° to 150° C., with the amount of time at a temperature in such range being from about 12 hours to 20 days.

For complete details of the preparation of ZSM-5 by a prior art method, U.S. Pat. No. 3,702,886 is incorporated herein by reference.

ZSM-11 can be suitably prepared by prior art methods, by preparing a solution $(R_4X)_2O$, sodium oxide, an oxide of aluminum or gallium, an oxide of silicon or germanium and water and having a composition, in terms of mole ratios of oxides, falling within the following ranges:

TABLE B

|  | Broad | Preferred |
|---|---|---|
| $\dfrac{YO_2}{W_2O_3}$ | 10–150 | 20–90 |
| $\dfrac{Na_2O}{YO_2}$ | 0.05–0.70 | 0.05–0.40 |
| $\dfrac{(R_4X)_2O}{YO_2}$ | 0.02–0.20 | 0.02–0.15 |
| $\dfrac{H_2O}{Na_2O}$ | 50–800 | 100–600 | wherein $R_4X$ is a cation of a quarternary compound of an element of Group 5A of the Periodic Table, W is aluminum or gallium and Y is silicon or germanium maintaining the mixture until crystals of the zeolite are formed. Preferably, crystallization is performed under pressure in an stirred autoclave or static bomb reactor. The temperature ranges from 100° C. to 200° C. generally, but at lower temperatures, e.g. about 100° C., crystallization time is longer. Thereafter the crystals are separated from the liquid and recovered. The new zeolite is preferably formed in an aluminosilicate form.

For complete details of the preparation of ZSM-11, U.S. Pat. No. 3,709,979 is incorporated herein by reference.

In preferred form, the zeolite made by the method of this invention, has a formula, in terms of mole ratios of oxides, as follows:

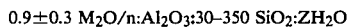

0.9±0.3 $M_2O/n:Al_2O_3$:30–350 $SiO_2$:$ZH_2O$ wherein M is an alkali metal or an alkaline earth metal and Z is 0 to 40.

The ZSM-5 made by the method of this invention is, as is the same zeolite made according to the prior art, preferably formed as the aluminosilicate, and it can be prepared utilizing materials which supply the elements of the appropriate oxide. Such materials include aluminum sulfate, a mineral acid such as sulfuric acid, sodium aluminate, alumina, sodium silicate, silica hydrosol, silica gel, silicic acid, sodium hydroxide, along with the reagents of the improved method of this invention. It will be understood that each oxide component utilized in the reaction mixture for preparing ZSM-5 can be supplied by one or more initial reactants, and they can be mixed together in any order. For example, sodium oxide can be supplied by an aqueous solution of sodium hydroxide or an aqueous solution of sodium silicate. To make the ZSM-5 using the present invention, a solution similar to that mentioned for Table A, but having a composition comprising materials having the following mole ratios of oxides may be used:

TABLE C-1

|  | Broad | Preferred | Particularly Preferred |
|---|---|---|---|
| $\dfrac{OH^-}{SiO_2}$ | 0.07–1.0 | 0.1–0.8 | 0.2–0.75 |
| $\dfrac{H_2O}{OH^-}$ | 10–300 | 10–300 | 10–300 |
| $\dfrac{SiO_2}{Al_2O_3}$ | 5–100 | 10–60 | 10–40 |
| $\dfrac{Alcohol}{Al_2O_3}$ | 0–400 | 0–300 | 0–150 |
| $\dfrac{NH_4OH}{Al_2O_3}$ | 0–250 | 0–150 | 0–100 |

It should be noted that in Table C-1 the $OH^-$ in the $NH_4OH$ is not included in the two ratios including that ion.

Stated on a different basis the values given in Table C-1 are the same as those set out in Table C-2 below:

TABLE C-2

|  | Preferred | Particularly Preferred |
|---|---|---|
| $\dfrac{Na_2O}{SiO_2}$ | 0.035–0.5 | 0.05–0.4 | 0.1–0.375 |
| $\dfrac{H_2O}{Na_2O}$ | 20–600 | 20–600 | 20–600 |
| $\dfrac{SiO_2}{Al_2O_3}$ | 5–100 | 10–60 | 10–40 |
| $\dfrac{Alcohol}{Al_2O_3}$ | 0–400 | 0–300 | 0–150 |
| $\dfrac{NH_4OH}{Al_2O_3}$ | 0–250 | 0–150 | 0–100 |

The reaction mixture can be prepared in either a batchwise or continuous manner. Crystal size and crystallization time of the ZSM-5 composition will vary with the nature of the reaction mixture employed.

The ZSM-5 product prepared in accordance with the present invention will exhibit an X-ray powder diffraction pattern conforming to Table C-3:

TABLE C-3

| Interplanar Spacing d (Å) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ⎫<br>     ⎬ ± 0.1<br>5.97 ⎭ | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | S |
| 2.99 ± 0.02 | W |

TABLE C-3-continued

| Interplanar Spacing d (A) | Relative Intensity |
|---|---|
| 2.94 ± 0.02 | W |

ZSM-11 made by the method of this invention is also preferably made as the aluminosilicate utilizing reactants which supply the needed oxides. Thus, the reaction mixture may comprise reactants to yield an alkali-metal oxide, e.g. sodium oxide, alumina and silica. The reaction mixture, which also comprises water and the reagents of the present improved method, will have a composition, in terms of mole ratios of oxides, as follows:

TABLE D

| | Broad | Preferred |
|---|---|---|
| $\frac{SiO_2}{Al_2O_3}$ | 10–150 | 20–90 |
| $\frac{Na_2O}{SiO_2}$ | 0.05–0.70 | 0.05–0.40 |
| $\frac{H_2O}{Na_2O}$ | 50–800 | 100–600 |
| $\frac{Alcohol}{Al_2O_3}$ | 0–400 | 0–300 |
| $\frac{NH_4OH}{Al_2O_3}$ | 0–250 | 0–150 |

The ZSM-5 and ZSM-11 zeolites produced by the method of the present invention have, as has already been stated, essentially the same x-ray diffraction as those prepared by conventional prior art methods. The products can also be expressed in terms of mole ratios of oxides as set forth hereinabove.

The ZSM-5 and ZSM-11 zeolites, as prepared by prior art methods, are useful, for example, as cracking and hydrocracking catalysts as well as catalysts for M-forming and dewaxing. However in order to increase their range of activities and their stability, it is necessary to remove the original metal ion, usually sodium. The original metal of most zeolites can be removed by conventional exchange procedures, as by multiple exchanges i.e. one exchange followed by another, etc. Some zeolites, ZSM-5 and ZSM-11 included, are not suspectible to this method of exchange, the sodium content reaching a plateau and remaining there regardless of the number of additional exchanges. It has been previously discovered that calcination of the zeolite by removing the organic N-containing cations "frees" the sodium so it can thereafter be removed easily. Typical replacing cations would include hydrogen, ammonium and metal cations, including mixtures of the same. Of the replacing cations, particular preference is given to cations of hydrogen, ammonium, rare earth, magnesium, zinc, calcium, nickel, and mixtures thereof, generally employed in the form of their salts, preferably the chlorides, nitrates or sulfates. This precalcination is not necessary, although it may still be used to remove the sodium cation from the products of this invention.

Representative, more detailed ion exchange techniques are disclosed in a wide variety of patents, including U.S. Pat. Nos. 3,140,249, 3,140,251, 3,140,253 and 3,702,866.

Following contact with the salt solution of the desired replacing cation, the zeolites prepared in accordance with this invention may be washed with water and dried at a temperature ranging from 150° F. to about 600° F. and thereafter may be heated in air or other inert gas at temperatures ranging from about 500° F. to 1500° F. for periods of time ranging from 1 to 48 hours or more. The zeolites thus produced and treated are also useful as cracking catalyst in cracking, hydrocracking, M-forming and dewaxing operation.

It is also possible to treat the zeolite with steam at elevated temperature ranging from 800° F. to 1800° F. and preferably 1000° F. and 1500° F., if such is desired. The treatment may be accomplished in atmospheres consisting partially or entirely of steam.

A similar treatment can be accomplished at lower temperatures and elevated pressures, e.g. 350°–700° F. at 10 to about 200 atmospheres.

The zeolites produced in the method of this invention may be used in a porous matrix. The zeolites can be combined, dispersed or otherwise intimately admixed with a porous matrix in such proportions that the resulting product contains from 1% to 95% by weight, and preferably from 1 to 70% by weight of the zeolite in the final composite.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Inorganic compositions especially those of a siliceous nature are preferred. Of these materials inorganic oxides such as clay, chemically treated clay, alumina, silica, silica-alumina, etc. are particularly preferred because of their superior porosity, attrition resistance, and stability. More preferably, alumina is the matrix, and it is preferably combined with the zeolite prior to calcination.

Techniques for incorporating the zeolites in a matrix are conventional in the art and are set forth in U.S. Pat. No. 3,140,253.

The following Examples serve to illustrate the scope of the invention showing that ZSM-5 crystalline aluminosilicates containing very low levels of organic nitrogen can be made by various techniques. It will be understood that the examples are not intended in any way to place a limitation on the invention.

A typical preparation of ZSM-5 according to the invention is given hereinbelow. The details and results for the product produced are listed in Example 1 of Table 1. An acid alumina solution containing 12.3 gms of $Al_2(SO_4)_3 \cdot 18H_2O$, 30.0 gms 98% $H_2SO_4$ and 600 gms of $H_2O$ was added to a sodium silicate solution made by mixing 360 gms of Q-Brand sodium silicate (28.8% $SiO_2$, 8.9% $Na_2O$, 62.4% $H_2O$) and 450 gms water. To the resilient gel was added 124 gms ethanol. The gel was mixed with the alcohol until homogeneous and crystallized at autogenous pressure in a stirred autoclave at 350° F. for 24 hours. The resultant solid material was water washed and dried at 230° F.

Examples 2–12 were made in a similar manner using the ingredients and conditions as shown in Tables 1–5.

Several of these examples were ion exchanged with ammonium salts without any prior calcination to show that sodium was easily replaced in such a procedure. Results were excellent as indicated in the appropriate tables.

TABLE 1

| | Ethanol | |
|---|---|---|
| Example | 1 | 2 |
| Mix Components, gms | | |
| A. Q Brand | 360 | 360 |
| H$_2$O | 450 | 450 |
| B. Al$_2$(SO$_4$)$_3$.18H$_2$O | 12.3 | 12.3 |
| H$_2$SO$_4$ (98%) | 30.0 | 30.0 |
| H$_2$O | 600 | 600 |
| C. Ethanol | 124 | 124 |
| Mole Ratio of Mix | | |
| Ethanol | 146 | 146 |
| Na$_2$O | 8.6 | 8.6 |
| Al$_2$O$_3$ | 1.0 | 1.0 |
| SiO$_2$ | 94 | 94 |
| H$_2$O | 3870 | 3870 |
| Na$_2$SO$_4$ | 19.0 | 19.0 |
| Crystallization | Stirred | Stirred |
| Temp., °F. | 350 | 350 |
| Time, hrs | 24 | 24 |
| Product | | |
| X-Ray Analysis | ZSM-5 | ZSM-5 |
| % Crystallinity | 90 | 135 |
| Composition, wt % | | |
| N | 0.03 | <0.01 |
| Na | 1.2 | 1.0 |
| Al$_2$O$_3$ | 2.35 | 2.07 |
| SiO$_2$ | 94.5 | 93.8 |
| Composition, mole Ratio | | |
| N$_2$O | 0.05 | |
| Na$_2$O | 1.14 | 1.07 |
| Al$_2$O$_3$ | 1.0 | 1.0 |
| SiO$_2$ | 68.5 | 77.0 |
| Catalytic Properties | | |
| M-Forming Screening Test (600° F., 400 psig, 15 WHSV, 3/1 H$_2$/HC) (1.5 g catalyst - charged 50/50 wt n-heptane/benzene) | | |
| Type Catalyst | H$^+$(1) | H$^+$ |
| n-Heptane Conv. wt % | 65.4 | 68.2 |
| Benzene, Conv., wt % | 24.6 | 27.1 |
| C$_7^+$ Aromatics Prod., wt % | 21.4 | 23.2 |
| Selectivity | 0.28 | 0.28 |

(1)Pre-calcination, 1000° F. + NH$_4$ Exchange

TABLE 2

| | Ethanol and Seeds | |
|---|---|---|
| Example | 3 | 4 |
| Starting Compositions gms. | | |
| A. Q-Brand | 45.0 | 360 |
| H$_2$O | 56.3 | 450 |
| B. Al$_2$(SO$_4$)$_3$.18H$_2$O | 1.54 | 12.3 |
| H$_2$SO$_4$ (98%) | 3.75 | 30.0 |
| H$_2$O | 77.0 | 600 |
| C. Ethanol | 15.5 | 94.0 |
| D. ZSM-5 seeds (19.3% Solids) | 3.25 | 26.0 |
| Mix Ratio - Moles | | |
| Ethanol | 111.0 | 111.0 |
| Na$_2$O | 8.6 | 8.6 |
| Na$_2$SO$_4$ | 19.0 | 19.0 |
| Al$_2$O$_3$ | 1.0 | 1.0 |
| SiO$_2$ | 94.0 | 94.0 |
| H$_2$O | 3870 | 3870 |
| Crystallization, Temp. °F. | 350 | 350 |
| Time, hrs | 97 | 21 |
| Product | | |
| X-Ray Analysis | ZSM-5 | ZSM-5 |
| % Crystallinity | 90 | 80 |
| Composition, wt % | | |
| N | 0.024 | 0.037 |
| Na | 1.50 | 1.20 |
| Al$_2$O$_3$ | 2.21 | 4.15 |
| SiO$_2$ | | 97.7 |
| Composition, Molar Ratio | | |
| Na$_2$O | 1.5 | 0.64 |
| Al$_2$O$_3$ | 1.0 | 1.0 |
| SiO$_2$ | | 40.0 |

TABLE 3

| | Seeds Only | |
|---|---|---|
| Examples | 5 | 6 |
| Starting Components, gms. | | |
| A. Q-Brand | 45.0 | 450 |
| H$_2$O | 56.3 | 563 |
| B. Al$_2$(SO$_4$)$_3$.18H$_2$O | 1.54 | 15.4 |
| H$_2$SO$_4$ (98%) | 3.75 | 37.5 |
| H$_2$O | 77.0 | 770 |
| C. ZSM-5 seeds (19.3% Solids) | 3.25 | 32.5 |
| Mixed Ratio - Moles | | |
| Na$_2$O | 8.6 | 8.6 |
| Na$_2$SO$_4$ | 19.0 | 19.0 |
| Al$_2$O$_3$ | 1.0 | 1.0 |
| SiO$_2$ | 94.0 | 94.0 |
| H$_2$O | 3870 | 3870 |
| ZSM-5, % Final Product | 5.7 | 5.7 |
| Crystallization | Static | Stirred |
| Temp. °F. | 350 | 350 |
| Time, hrs. | 96 | 24 |
| Product | | |
| X-Ray Analysis | ZSM-5 | ZSM-5 |
| % Crystallinity | 90 | 105 |
| Composition, wt % | | |
| N | 0.02 | 0.03 |
| Na | 1.50(1) | 1.79(1) |
| Al$_2$O$_3$ | 2.40 | 2.44 |
| SiO$_2$ | | 97.2 |
| Composition, Molar Ratio | | |
| Na$_2$O | 1.38 | 1.63 |
| Al$_2$O$_3$ | 1.0 | 1.0 |
| SiO$_2$ | | 67.8 |
| Catalytic Properties (M-Forming Screening Test) (600° F., 400 psig, 15 WHSV, 3/1 H$_2$/HC, 1.5 gms. cat.) | | |
| Type Catalyst | | H$^+$(2) |
| n-Heptane Conv., wt % | | 89.6 |
| Benzene, Conv., wt % | | 30.8 |
| C$_7^+$ Aromatics Prod., wt % | | 29.2 |
| Selectivity | | 0.31 |

(1)This value is reduced to 0.087% on Example 5 and 0.04% on Example 6 when exchanged with NH$_4$Cl without any precalcination.
(2)Pre-calcination, 1000° F. + NH$_4$ exchange.

TABLE 4

| | Ethanol + NH$_4$OH |
|---|---|
| Example | 7 |
| Mix Components, gms | |
| A. Q Brand | 362 |
| H$_2$O | 478 |
| B. Al$_2$(SO$_4$)$_3$.18H$_2$O | 13.1 |
| H$_2$SO$_4$ (98%) | 31.9 |
| H$_2$O | 658 |
| C. Ethanol | 131 |
| NH$_4$OH, Conc., ml | 148 |
| Mole Ratio of Mix | |
| Ethanol | 146 |
| NH$_4$OH | 114 |
| Na$_2$O | 8.6 |
| Al$_2$O$_3$ | 1.0 |
| SiO$_2$ | 94.0 |
| H$_2$O | 3870 |
| Na$_2$SO$_4$ | 19.0 |
| Crystallization | Stirred |
| Temp., °F. | 350 |
| Time, hrs | 21 |
| Product | |
| X-Ray Analysis | ZSM-5 |
| % Cryst. | 110 |
| Composition, wt % | |
| N | 0.044 |
| Na | 0.94 |
| Al$_2$O$_3$ | 2.41 |
| SiO$_2$ | 96.1 |
| Composition, mole ratio | |
| N$_2$O | 0.07 |
| Na$_2$O | 0.87 |
| Al$_2$O$_3$ | 1.00 |

TABLE 4-continued

| Example | Ethanol + NH4OH 7 |
|---|---|
| SiO$_2$ | 67.8 |
| Catalytic Properties | |
| M-Forming Screening Test (600° F., 400 psig, 15 WHSV, 3/1 H$_2$/HC) | |
| (1.5 g catalyst-charged 50/50 wt n-heptane/benzene) | |
| Type Catalyst | H$^{30}$ (1) |
| n-Heptane Conv., wt % | 76.6 |
| Benzene Conv., wt % | 26.4 |
| C$_7$+ Aromatics Prod., wt % | 24.9 |
| Selectivity | 0.31 |

(1) NH$_4$ Exch., 210° F. without pre-calcination
Na = 0.01%

TABLE 5

| | Ethanol + NH4OH + Seeds | | | | |
|---|---|---|---|---|---|
| Example | 8 | 9 | 10 | 11 | 12 |
| Mix Components - gms. | | | | | |
| A. Q-Brand | 360 | 45 | 45 | 255.2 | 45 |
| H$_2$O | 450 | 56.3 | 56.3 | 280 | 56.3 |
| Ludox (29.5% SiO$_2$) | 450 | 56.3 | 56.3 | 280 | 56.3 |
| B. Al$_2$(SO$_4$)$_3$.18H$_2$O | 12.42 | 1.54 | 1.54 | 20.0 | 6.0 |
| H$_2$SO$_4$ | 30.0 | 3.75 | 3.75 | 20.0 | 2.25 |
| H$_2$O | 616 | 77.0 | 77.0 | 480 | 77.0 |
| C. Ethanol | 124 | 15.5 | 15.5 | 124 | 15.5 |
| NH$_4$OH conc., ml. | 140 | 17.5 | 17.5 | 140 | 17.5 |
| D. ZSM-5 seeds (19.3% solids) | 26.0 | 3.25 | 3.25 | 21.0 | 3.25 |
| Mole Ratio of Mix | | | | | |
| Ethanol | 73 | 73 | 146 | 90 | 336 |
| NH$_4$OH | 115 | 115 | 115 | 69 | 28.5 |
| Na$_2$O | 8.6 | 8.6 | 8.6 | 2.56 | 1.66 |
| Al$_2$O$_3$ | 1.0 | 1.0 | 1.0 | 1.0 | 1.0 |
| SiO$_2$ | 94.0 | 94.0 | 94.0 | 40.8 | 23.9 |
| H$_2$O | 3870 | 2870 | 3870 | 1700 | 990 |
| Na$_2$SO$_4$ | 19.0 | 19.0 | 19.0 | 9.7 | 5.4 |
| ZSM-5 Seeds, % Final Product | 5.7 | 5.7 | 5.7 | 5.5 | 4.5 |
| Crystallization | stirred | static | static | stirred | static |
| Temp., °F. | 350 | 446 | 255 | 350 | 400 |
| Time, hrs. | 17 | 22 | 334 | 120 | 96 |
| Product | | | | | |
| X-Ray Analysis | ZSM-5 | ZSM-5 | ZSM-5 | ZSM-5 | ZSM-5 |
| % Cryst. | 95 | 110 | 95 | 80 | 65 |
| Composition, wt % | | | | | |
| N | 0.053 | 0.13 | 0.19 | 0.011 | 0.016 |
| C | 0.42 | | | | |
| Na | 1.3(1) | 0.98 | | 1.7(1) | 3.2 |
| Al$_2$O$_3$ | 2.53 | 2.13 | | 4.36 | 6.40 |
| SiO$_2$ | 97.2 | 95.6 | | 92.8 | 88.2 |
| Composition, mole ratio | | | | | |
| N$_2$O | 0.08 | 0.24 | | 0.01 | |
| Na$_2$O | 1.14 | 1.02 | | 0.87 | 1.1 |
| Al$_2$O$_3$ | 1.0 | 1.0 | | 1.00 | 1.0 |
| SiO$_2$ | 65.3 | 76.2 | | 36.1 | 23.4 |
| Catalytic Properties | | | | | |
| M-Forming Screening Test (600° F., 400 psig, 15 WHSV, 3/1 H$_2$/HC, 1.5 g. catalyst - charge 50/50 wt n-Heptane/Benzene) | | | | | |
| Type Catalyst | H$^+$(2) | | | H$^+$(2) | |
| n-Heptane Conv., wt % | 80.2 | | | 95.0 | |
| Benzene Conv., Wt % | 32.0 | | | 27.8 | |
| C$_7$+ Aromatics Prod., wt % | 28.9 | | | 27.4 | |
| Selectivity | 0.32 | | | 0.28 | |

(1)These values are reduced to 0.03% for Example 8 and 0.05% for Example 11. When uncalcined samples are exchanged with NH$_4$Cl.
(2)Calcination 1000° F. + NH$_4$$^+$ Exchange

We claim:

1. An uncalcined zeolite having the characteristic X-ray diffraction pattern of zeolite ZSM-5 having a nitrogen content of no more than 0.2 wt. %, substantially free of organic nitrogen and being capable of substantially complete ion exchange of its original metal cations without prior calcination.

* * * * *